United States Patent
Dong et al.

(10) Patent No.: US 8,955,027 B1
(45) Date of Patent: Feb. 10, 2015

(54) TRANSCODING MEDIA STREAMS USING SUBCHUNKING

(71) Applicant: Google Inc., Mountain View, CA (US)

(72) Inventors: Jianpeng Dong, Palo Alto, CA (US); Krishnan Eswaran, Oakland, CA (US); Jiening Zhan, Sunnyvale, CA (US); Vijnan Shastri, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/086,541

(22) Filed: Nov. 21, 2013

(51) Int. Cl.
  *H04N 7/173* (2011.01)
  *H04N 21/234* (2011.01)

(52) U.S. Cl.
  CPC ....... *H04N 21/23424* (2013.01); *H04N 21/234* (2013.01)
  USPC ................. 725/116; 725/93; 725/94; 725/95; 725/96; 725/97; 725/109; 725/114; 725/146

(58) Field of Classification Search
  USPC ....................... 725/93–97, 109, 114, 116, 146
  See application file for complete search history.

(56) References Cited

U.S. PATENT DOCUMENTS

| 2007/0230586 | A1 | 10/2007 | Shen et al. |
| 2008/0270567 | A1 | 10/2008 | Stiers et al. |
| 2009/0322784 | A1 | 12/2009 | Sartori |
| 2011/0161409 | A1 | 6/2011 | Nair et al. |
| 2012/0030723 | A1* | 2/2012 | Baum et al. .................... 725/105 |
| 2012/0281748 | A1* | 11/2012 | Peng et al. ............... 375/240.01 |
| 2013/0083848 | A1 | 4/2013 | Joch et al. |
| 2013/0114744 | A1 | 5/2013 | Mutton |
| 2014/0208374 | A1* | 7/2014 | Delaunay et al. ............. 725/109 |

FOREIGN PATENT DOCUMENTS

| CN | 102790905 A | 11/2012 |
| CN | 102902802 A | 1/2013 |
| CN | 102902803 A | 1/2013 |
| CN | 102932334 A | 2/2013 |
| JP | 2005176069 A | 6/2005 |
| JP | 2010287110 A | 12/2010 |
| WO | WO-2013037241 A1 | 3/2013 |

* cited by examiner

*Primary Examiner* — Mulugeta Mengesha
(74) *Attorney, Agent, or Firm* — Honigman Miller Schwartz and Cohn LLP (57) ABSTRACT

A method including receiving an input media stream and splitting a video portion of a received portion of the input media stream into input video chunks, while receiving a remaining portion of the input media stream. For each input video chunk of the video portion of the input media stream, the method includes assigning the input video chunk to one or more slave transcoders, splitting the input video chunk into video subchunks, and separately feeding each input video subchunk to each of the one or more slave transcoders. The method includes separately receiving output video subchunks from the one or more slave transcoders. Each output video subchunk respectively corresponds to one of the input video subchunks. The method also includes assembling the output video subchunks into an output video chunk corresponding to the input video chunk and assembling the output video chunks into an output media stream.

31 Claims, 6 Drawing Sheets

TRANSCODING MEDIA STREAMS USING SUBCHUNKING

TECHNICAL FIELD

This disclosure relates to techniques for transcoding media streams using subchunking.

BACKGROUND

There is a growing demand to receive live television streams at user devices such as smartphones and tablets. Making live television streams available to mobile devices with low end-to-end latency, however, presents a challenge to content providers. Current solutions provide end-to-end latency that may exceed 60 seconds. Such latency measures are unappealing to customers.

SUMMARY

One aspect of the disclosure provides a method including receiving an input media stream encoded according to a first set of encoding parameters. The method also includes splitting a video portion of a received portion of the input media stream into input video chunks, while receiving a remaining portion of the input media stream. For each input video chunk of the video portion of the input media stream, the method further includes assigning the input video chunk to one or more slave transcoders, splitting the input video chunk into video subchunks, and separately feeding each input video subchunk to each of the one or more slave transcoders that transcode data from the first set of encoding parameters to a second set of encoding parameters. The method further includes transcoding each input video subchunk into a corresponding output video subchunk and assembling the output video subchunks into an output video chunk corresponding to the input video chunk. The method also includes assembling the output video chunks into an output media stream.

Implementations of the disclosure may include one or more of the following features. In some implementations, the method includes splitting a received portion of the input video chunk into input video subchunks, while still receiving a remaining portion of the input video chunk. The method may also include feeding at least one input video subchunk to the one or more slave transcoders, while still receiving the remaining portion of the input video chunk. Each slave transcoder may include a slave decoder and a slave encoder. The slave encoder encodes a first input video subchunk, while the slave decoder decodes a second input video subchunk. The method may include assembling the output video chunks into the output media stream while splitting any remaining portion of the video portion of the input media stream into input video chunks.

In some examples, the method includes assigning the input video chunk to a plurality of slave transcoders. Additionally or alternatively, one of the plurality of slave transcoders may complete transcoding the input video chunk, commanding the other slave transcoders of the plurality of transcoders to stop transcoding the input video subchunks of the input video chunk. Additionally or alternatively, the method may include identifying all of the slave transcoders as being available to receive another input video chunk, after commanding the other slave transcoders of the plurality of transcoders to stop transcoding.

In some implementations, the method includes demultiplexing the input media stream into the video portion and an audio portion of the input media stream, and splitting the audio portion of the input media stream into input audio chunks. Each input audio chunk respectively corresponds to one of the input video chunks of the video portion. Additionally or alternatively, each corresponding pair of input audio chunk and input video chunk may begin at a same time within the input media stream and have a same time length.

For each input audio chunk, the method may include decoding the input audio chunk into audio samples. When a lost audio packet within the input audio chunk is detected, the method may include inserting a silent audio sample into the audio samples at a location corresponding to the lost audio packet and encoding the audio samples into an output audio chunk. Additionally or alternatively, the method may include assembling the output video chunks into the output video stream, including aligning each output audio chunk with a corresponding output video chunk.

In some implementations, the method includes retrieving the one or more slave transcoders from a queue of available transcoders. When the one or more slave transcoders completes transcoding an assigned input video chunk, the method may include releasing the one or more transcoders back into the queue of transcoders.

For each input video chunk, the method may include obtaining at least one preceding input video subchunk of a preceding input video chunk that immediately precedes the input video chunk. The method may include feeding the at least one preceding input video subchunk to the one or more slave transcoders before feeding the input video subchunks of the input video chunk. The method may further include publishing the output media stream, and transmitting the output media stream to a user device.

Another aspect of the disclosure provides a transcoding server including a non-transitory computer readable medium, a plurality of slave transcoders and a processing device. The non-transitory computer readable medium stores computer readable instructions. The plurality of slave transcoders transcode data from a first set of encoding parameters to a second set of encoding parameters. The processing device is in communication with the computer readable medium and executes the computer readable instructions. The computer readable instructions cause the processing device to receive an input media stream encoded according to the first set of encoding parameters. The computer readable instructions also cause the processing device to split a video portion of a received portion of the input media stream into input video chunks, while receiving a remaining portion of the input media stream. For each input video chunk of the video portion of the input media stream, the processing device assigns the input video chunk to one or more slave transcoders, splits the input video chunk into input video subchunks, separately feeds each input video subchunk to each of the one or more slave transcoders that transcode the input video subchunk into an output video subchunks. When one of the one or more slave transcoders transcodes all of the input video subchunks of the input video chunk to output video subchunks, the slave transcoder assembles the output video subchunks into an output video chunk. The processing device receives the output video chunk corresponding to the input video chunk from the one slave transcoder and assembles the output video chunks into an output media stream.

In some implementations, the processing device splits a received portion of the input video chunk into input video subchunks, while still receiving a remaining portion of the input video chunk. The processing device further feeds at least one input video subchunk to the one or more slave transcoders while still receiving the remaining portion of the input video chunk. The processing device may assemble the output video chunks in to the output media stream while splitting any remaining portion of the video portion of the input media stream into input video chunks.

Each slave transcoder may include a slave decoder and a slave encoder. The slave encoder encodes a first input video subchunk, while the slave decoder decodes a second input video subchunk. The processing device may further assign the input video chunk to a plurality of slave transcoders. Additionally or alternatively, when one of the plurality of slave transcoders completes transcoding the video chunk, the processing device may command the other slave transcoders of the plurality of transcoders to stop transcoding the input video subchunks of the input video chunk. Additionally or alternatively, after commanding the other slave transcoders of the plurality of transcoders to stop transcoding, the processing device may identify all of the slave transcoders as being available to receive another input video chunk.

In some examples, the processing device demultiplexes the input media stream into the video portion and an audio portion of the input media stream and splits the audio portion of the input media into input audio chunks. Each input audio chunk respectively corresponds to one of the input video chunks of the video portion. Each corresponding pair of input audio chunk and input video chunk may begin at a same time within the input media stream and have a same time length.

For each input audio chunk, the processing device may decode the input audio chunk into audio samples. When a lost audio packet within the input audio chunk is detected, the processing device may insert a silent audio sample into the audio samples at a location corresponding to the lost audio packet. The processing device may further encode the audio samples into an output audio chunk. Additionally or alternatively, the server may assemble the output video chunks into the output video stream, including aligning each output audio chunk with a corresponding output video chunk.

In some examples, the processing device retrieves the one or more slave transcoders from a queue of available transcoders. When the one or more slave transcoders completes transcoding an assigned input video chunk, the processing device releases the one or more transcoders back into the queue of transcoders. The processing device may publish the output media stream and transmit the output media stream to a user device. The processing device may execute the slave transcoders, and the slave transcoders may execute on one or more other processing devices in communication with the processing device.

Another aspect of the disclosure provides a transcoding server including a non-transitory computer readable medium, a plurality of slave transcoders and a processing device. The non-transitory computer readable medium stores computer readable instructions. The plurality of slave transcoders transcode data from a first set of encoding parameters to a second set of encoding parameters. The processing device is in communication with the computer readable medium and executes the computer readable instructions. The computer readable instructions cause the processing device to receive an input media stream encoded according to the first set of encoding parameters. The computer readable instructions also cause the processing device to split a video portion of a received portion of the input media stream into input video chunks, while receiving a remaining portion of the input media stream. For each input video chunk of the video portion of the input media stream, the processing device assigns the input video chunk to one or more slave transcoders, splits the input video chunk into input video subchunks, and separately feeds each input video subchunk to each of the one or more slave transcoders. The processing device also receives output video subchunks from the one or more slave transcoders and assembles the output video subchunks into an output video chunk corresponding to the input video chunk. Each output video chunk respectively corresponds to one of the input video subchunks. The processing device further includes assembling the output video chunks into an output media stream.

In some implementations, the processing device splits a received portion of the input video chunk into input video subchunks, while still receiving a remaining portion of the input video chunk. The processing device further feeds at least one input video subchunk to the one or more slave transcoders while still receiving the remaining portion of the input video chunk. The processing device may assemble the output video chunks into the output media stream while splitting any remaining portion of the video portion of the input media stream into input video chunks.

Each slave transcoder may include a slave decoder and a slave encoder. The slave encoder encodes a first input video subchunk, while the slave decoder decodes a second input video subchunk. The processing device may further assign the input video chunk to a plurality of slave transcoders. Additionally or alternatively, when one of the plurality of slave transcoders completes transcoding the video chunk, the processing device may command the other slave transcoders of the plurality of transcoders to stop transcoding the input video subchunks of the input video chunk. Additionally or alternatively, after commanding the other slave transcoders of the plurality of transcoders to stop transcoding, the processing device may identify all of the slave transcoders as being available to receive another input video chunk.

In some examples, the processing device demultiplexes the input media stream into the video portion and an audio portion of the input media stream and splits the audio portion of the input media into input audio chunks. Each input audio chunk respectively corresponds to one of the input video chunks of the video portion. Each corresponding pair of input audio chunk and input video chunk may begin at a same time within the input media stream and have a same time length.

For each input audio chunk, the processing device may decode the input audio chunk into audio samples. When a lost audio packet within the input audio chunk is detected, the processing device may insert a silent audio sample into the audio samples at a location corresponding to the lost audio packet. The processing device may further encode the audio samples into an output audio chunk. Additionally or alternatively, the server may assemble the output video chunks into the output video stream, including aligning each output audio chunk with a corresponding output video chunk.

In some examples, the processing device retrieves the one or more slave transcoders from a queue of available transcoders. When the one or more slave transcoders completes transcoding an assigned input video chunk, the processing device releases the one or more transcoders back into the queue of transcoders. The processing device may publish the output media stream and transmit the output media stream to a user device. The processing device may execute the slave transcoders, and the slave transcoders may execute on one or more other processing devices in communication with the processing device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
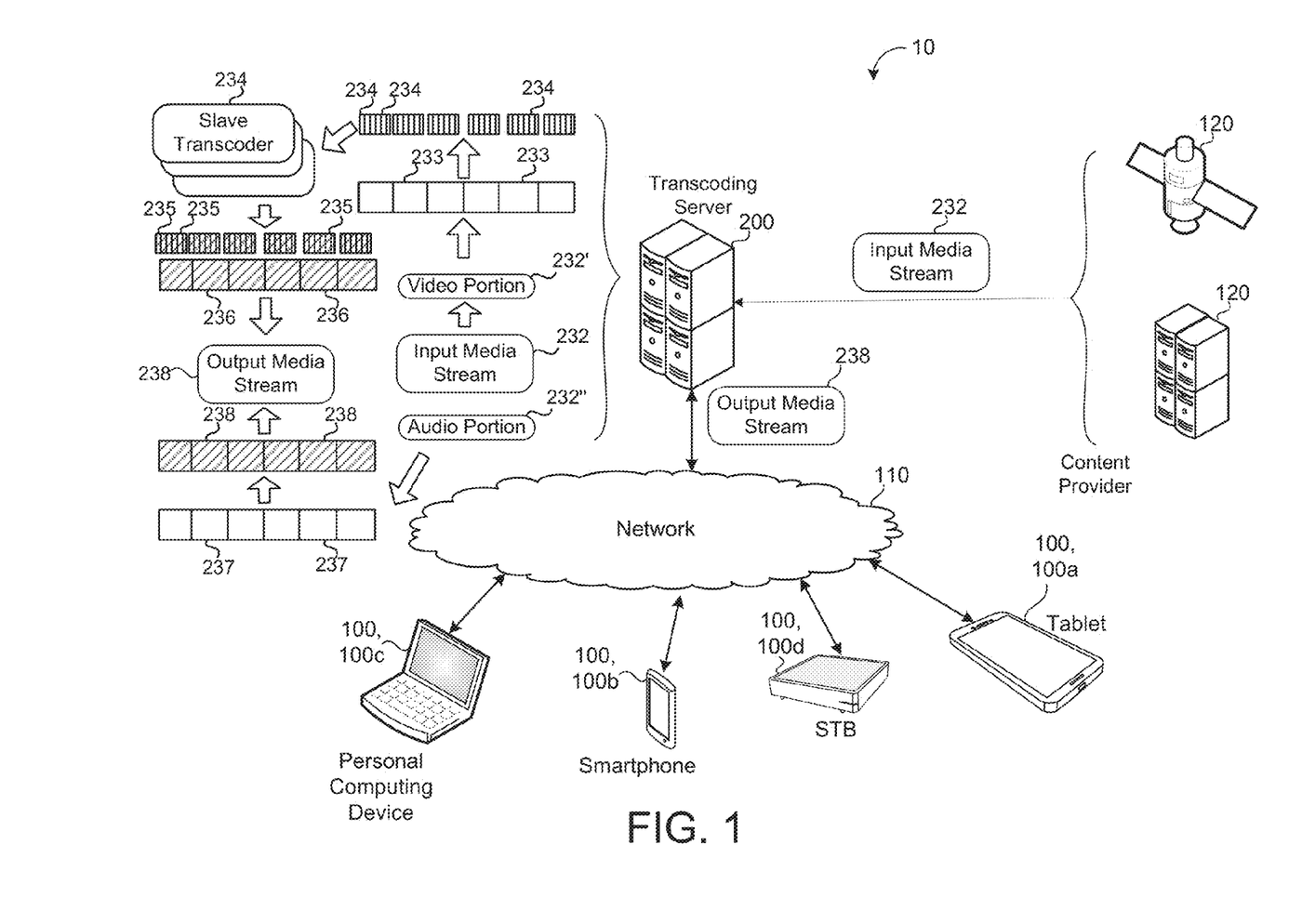
FIG. 1 is a schematic view illustrating an example system for delivering media stream to a user device.

FIG. 1 illustrates an exemplary system 10 for delivering a media stream to a user device 100. In some implementations, a transcoding server 200 receives an input media stream 232 from a content provider 120. The input media stream 232 contains the media content and is encoded according to a first set of encoding parameters (e.g., a 1080p MP4 encoding). The transcoding server 200 may receive the input media stream 232 from any suitable source, including by way of transmission from a satellite 120A and/or a content server 120B via a network 110. In some examples, the input media stream 232 is a live television stream, e.g., a live television broadcast that is to be transmitted to one or more user devices 100. Additionally or alternatively, the input media stream 232 is a requested media content that is requested from a user device (e.g., video-on-demand service).

The transcoding server 200 transcodes the input media stream 232 into an output media stream 239 encoded according to a second set of parameters (e.g., 720p MP4 encoding). The transcoding server 200 (or another server) can transmit the output media stream 239 to a user device 100. Examples of user devices include, but are not limited to, tablet computing devices 100A, smartphones 100B, personal computing devices 100C, and set-top-boxes 100D. The user device 100 can play the output media stream 239 via one or more user interfaces (e.g., display device and/or speaker). An input or output media stream 232, 239 may include a video portion 232' and/or an audio portion 232". The user devices 100 can request the output media stream 239 in any suitable manner. For instance, in the case of a smartphone or tablet type of user device 100, a user may access a dedicated application on the user device 100. In the application, the user can select a media stream (e.g., a channel or video). The user device 100 transmits a request to the transcoding server 200 (or a server associated therewith) requesting the selected content. In response to the request, the transcoding server 200 (or an associated server) can stream an output media stream 239 to the user device 100. The output media stream 239 can be encoded with parameters suitable for the user device 100.

In operation, the transcoding server 200 demultiplexes the input media stream 232 into a video portion 232' and an audio portion 232" (that is when the media stream includes an audio portion and a video portion). The transcoding server 200 splits the video portion 232' of the input media stream 232 into a plurality of input video chunks 233 and each input video chunk 233 into a plurality of input video subchunks 234. An input video chunk 233 is a segment of video data of the input media stream 232. An input video subchunk 234 is a segment of an input video chunk 233. In some implementations, each of the input video chunks 233 is split into equal size segments (e.g., five milliseconds). Similarly, each of the input video subchunks 234 is split into equal size subsegments (e.g., 0.5 milliseconds). Thus, each of the input video chunks 233 includes an equal number of input video subchunks 234. For purposes of clarity, video chunks 234 and video subchunks 233 that have not yet been transcoded by the transcoding server 200 are referred to as input video chunks 233 and input video subchunks 234.

The transcoding server 200 assigns each input video chunk 233 of the input media stream 232 to one or more available slave transcoders 220. The transcoding server 200 feeds the video subchunks 234 of a respective video chunk 233 to the one or more slave transcoders 220 to which the respective video chunk 233 was assigned. The one or more slave transcoders 220 transcode each of the input video subchunks 234 into output video subchunks 235. In some implementations, the one or more slave transcoders 220 assemble output video chunks 236 that correspond to respective input video chunks 233 using the output video subchunks 235. The slave transcoders 220 can return output video chunks 236. In some implementations, the slave transcoders 220 can output individual output video subchunks 235, which are subsequently assembled into an output video chunk 236. The slave transcoders 220 may be implemented as part of the transcoding server 200 or may be external to the transcoding server 200.

In some implementations, the transcoding server 200 assigns each input video chunk 233 to a plurality of slave transcoders 220 (e.g., three slave transcoders 220). Then the transcoding server 200 feeds the input video subchunks 234 of the input video chunk 233 to the assigned slave transcoders 220. The assigned slave transcoders 220 transcode the input video subchunks 234 until one of the assigned slave transcoders 220 completes transcoding the input video chunk 233 into an output video chunk 236. Once completed, the transcoding server 200 can stop the other slave transcoders 220. The transcoding server 200 can change the state of all of the assigned slave transcoders 220 to available.

In scenarios where the input media stream 232 includes an audio portion 232", the transcoding server 200 can transcode the audio portion 232". In some implementations, the transcoding server 200 can divide the audio portion 232" into a series of input audio chunks 237. The transcoding server 200 transcodes the input audio chunks 237 into output audio chunks 238. In some implementations, the input audio chunks 237 are split into input audio subchunks (not shown), which are transcoded into output audio subchunks (not shown). The output audio subchunks are assembled into the output audio chunks 238.

The transcoding server 200 can assemble the output media stream 239 based on the output video chunks 236 and output audio chunks 238. The transcoding server 200 (or another server associated with the transcoding server 200) can deliver the output media stream to one or more user devices 100 via the network 110.

Figure 2A:
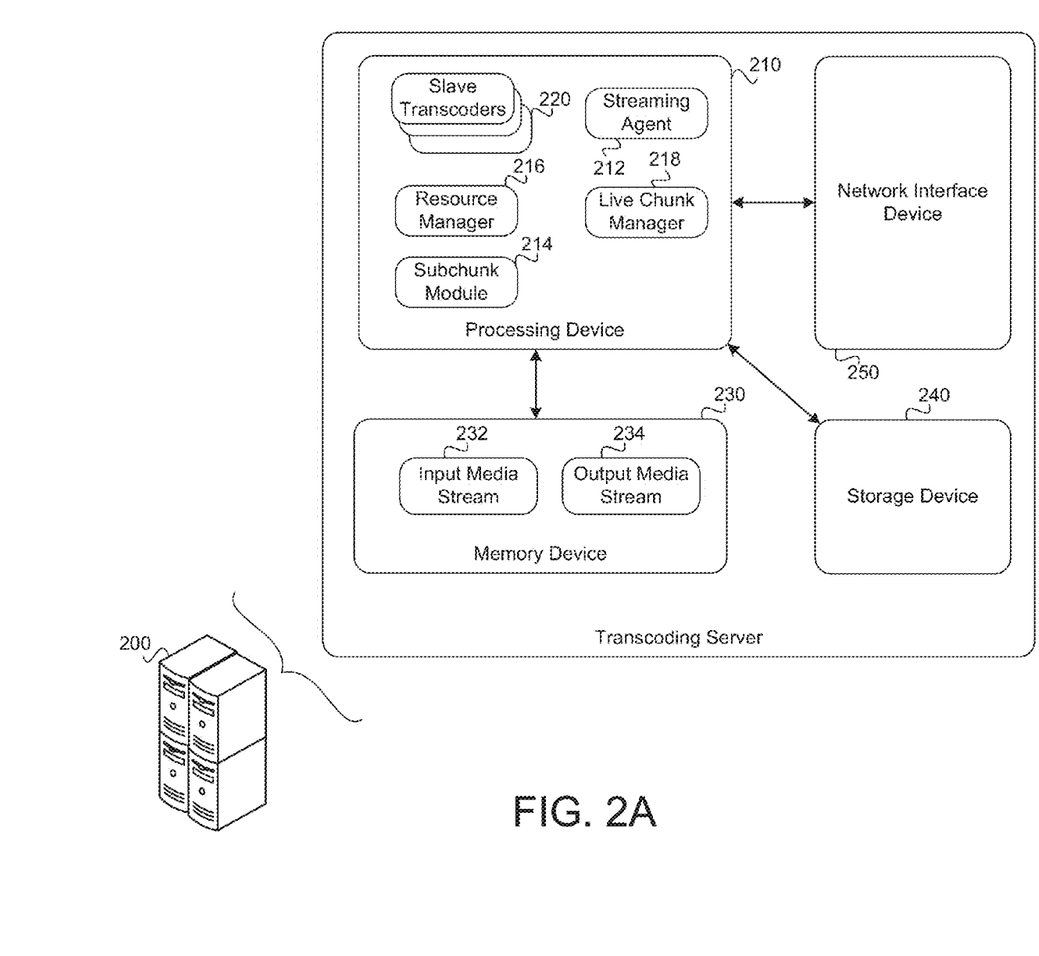
FIG. 2A is a schematic view illustrating example components of a transcoding server.
Figure 2B:
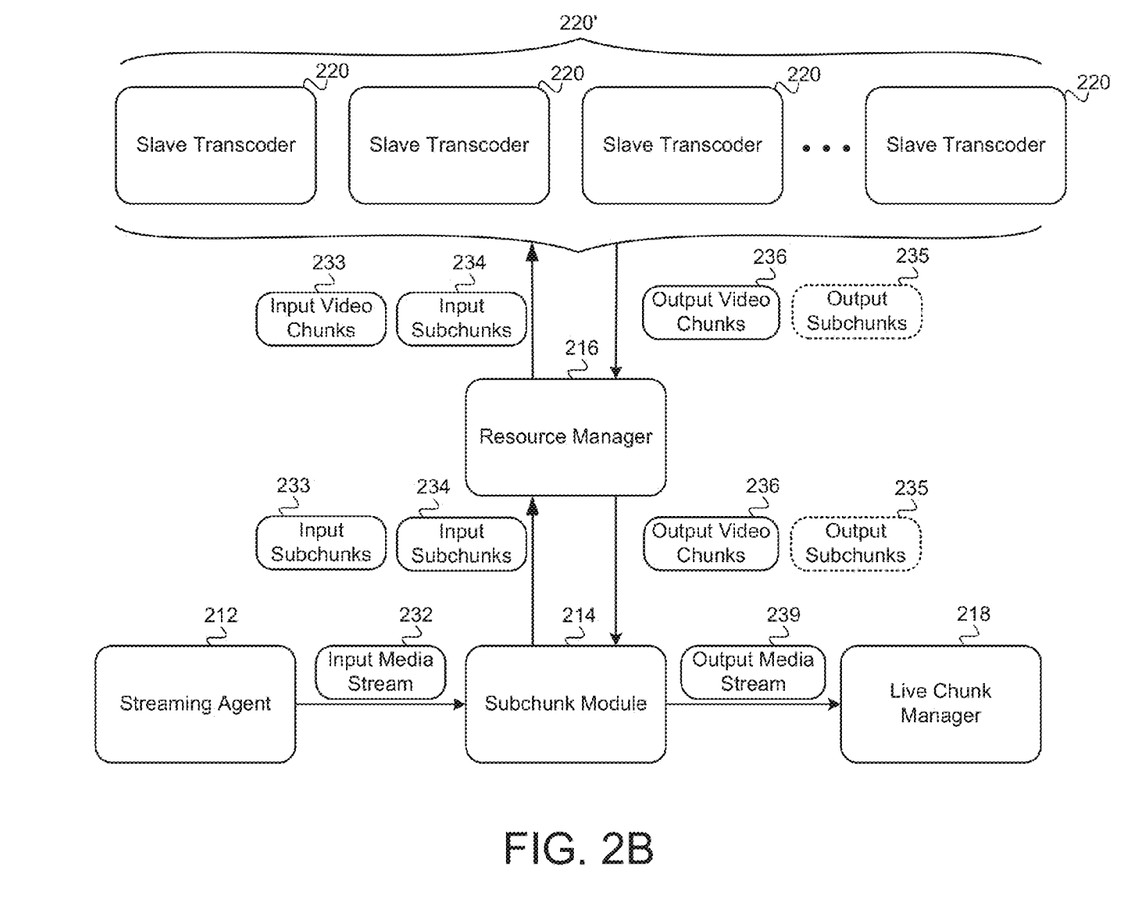
FIG. 2B is a schematic view illustrating an example data flow of the transcoding server.

FIGS. 2A and 2B illustrate an example of a transcoding server 200. FIG. 2A illustrates components of the transcoding server 200. FIG. 2B illustrates an example data flow of the transcoding server 200. The transcoding server 200 may include a processing device 210, a memory device 230, a storage device 240, and a network interface device 250. The components of the transcoding server 200 may be connected by one or more busses and/or a network 110. While the transcoding server 200 is illustrated as a device at a single location, the transcoding server 200 may be implemented in a distributed manner, such that components may be implemented as multiple devices at different physical locations. In such scenarios, the components may communicate over a network 110 (e.g., the Internet and/or one or more intranets).

The processing device 210 includes one or more physical processors that execute computer-readable instructions (e.g., executable computer code). In implementations where the processing device 210 includes two or more processors, the two or more processors can operate in an individual or distributed manner. The processing device 210 can execute a streaming agent 212, a subchunk module 214, a resource manager 216, a live chunk manager 218, and a plurality of slave transcoders 220, all of which may be implemented as computer readable instructions. The foregoing components collectively form a transcoding pipeline. In some implementations, some of the executed components are implemented at different physical devices. For instance, the live chunk manager 218 and the streaming agent 212 may execute at a first location/device and the subchunk module 214, the resource manager, and the slave transcoders 220 may execute at a second location/device. Moreover, the slave transcoders 220 may execute on one or more other processing devices 210 in communication with the processing device 210.

The memory device 230 includes one or more volatile, non-transitory computer-readable mediums (e.g., RAM and/or ROM). The memory device 230 can store portions of the input media stream 232 and portions of the output media stream 239. The memory device 230 can further store the computer readable instructions discussed above.

The storage device 240 includes one or more non-volatile, non-transitory computer-readable mediums (e.g., flash disk, HDD, or the like). The storage device 240 can store any suitable data, including input video chunks 233 and its corresponding subchunks 234, output video chunks 236 and its corresponding subchunks 235, input audio chunks 237 and its corresponding subchunks, and output audio chunks 239 and its corresponding subchunks. The storage device 240 can additionally store metadata corresponding to the audio and video data.

The network interface device 250 receives data from and transmits data to the network 110. The network interface device 250 can include one or more devices that communicate with the network 110. The network interface device 250 can perform wired and/or wireless communication.

The streaming agent 212 is the entry point of the transcoding pipeline. The streaming agent 212 receives input media streams 232 from various content sources 120. An individual input media stream 232 may be received as a series of data packets or as an analog signal. In the case of digital input media streams 232, each packet of an input media stream 232 may include audio data and/or video data as well as metadata regarding the input media stream 232. Examples of metadata regarding the input media stream 232 include, but are not limited to, a name of the stream (e.g., NBCUHD for a live stream received from NBC), a timestamp of the data contained in the data packet, encoding parameters of the input media stream 232 (e.g., H264_1080p). The streaming agent 212 can store the input media stream 232 in the memory device 230 and/or can provide the input media stream 232 to the subchunk module 214. In scenarios where the input media stream 232 is an analog signal, the streaming agent 212 can include an analog-to-digital converter which converts the analog input media stream 232 to a digital input media stream 232.

The subchunk module 214 obtains the input media stream 232 from the streaming agent 212 and/or from the memory device 230. The subchunk module 214 demultiplexes the input media stream 232 to obtain a video portion 232' and an audio portion 232" of the input media stream 232. The subchunk module 214 splits the video portion 232' of the input media stream 232 into a series of video chunks 233 and each video chunk 233 into a series of video subchunks 234. The subchunk module 214 provides the video subchunks 234 and optionally the video chunks 233 to the resource manager 216.

The subchunk module 214 may be further configured to transcode the audio portion 232" of the input media stream 232. The subchunk module 214 splits the transcoded audio portion 232" into input audio chunks 237. The subchunk module 214 transcodes the input audio chunks 237 into output audio chunks 238. The output audio chunks 238 are used to assemble the output media stream 239 and can also be communicated to the resource manager 216 for storage and debugging purposes.

The resource manager 216 receives the input video subchunks 234 of each input video chunk 233. For each input video chunk 233, the resource manager 216 assigns the input video chunk 233 to one or more slave transcoders 220. When the resource manager 216 begins receiving the video subchunks 234 of a new video chunk 233, the resource manager 216 assigns the new video chunk 233 to m slave transcoders (where m is greater than or equal to one). In some implementations, available slave transcoders 220 wait in a first-in-first-out (FIFO) queue 220'. The resource manager 216 selects the m slave transcoders 220 based on the ordering of the queue 220'.

In implementations where m is greater than one, the resource manager 216 feeds each video subchunk 234 of the new video chunk 233 to each of the m slave transcoders. The slave transcoders 220 return output video chunks 236 to the resource manager 216. When one of the m transcoders 220 finishes transcoding the entire video chunk 233, the resource manager 216 can stop the other m−1 slave transcoders 220. A slave transcoder 220 finishes an entire video chunk 233 when the slave transcoder 220 has transcoded all of the input video subchunks 234 of the input video chunk 233 and returned a corresponding output video chunk 236 to the resource manager 216. Once the resource manager stops the m−1 slave transcoders, the state of the m slave transcoders 220 is changed to available and the m slave transcoders 220 return to the queue 220'. In this way, the transcoding of a video chunk 224 is less likely to be delayed by a slow slave transcoder 220. Furthermore, these implementations offer redundancy in the case that one or more of the m slave transcoders 220 fails. Moreover, it is less likely that an input video chunk 233 is unable to be transcoded.

In some implementations, the resource manager 216 returns output video chunks 236 to the subchunk module 214. In some implementations, the resource manager 216 also writes the output video subchunks 235 and output video chunks 236 to the storage device 240 for later analysis and/or debugging purposes.

The subchunk module 214 assembles the output media stream 239 based on the output video chunks 236 and the output audio chunks 238. The subchunk module 214 can assemble the output media stream 239 according to one or more protocols. For instance, the subchunk module 214 can generate the output media stream 239 according to the MPEG Dynamic Adaptive Streaming over HTTP (DASH) protocol and/or the Apple HTTP Live Streaming (HLS) protocol. The subchunk module 214 can generate the output media stream 239 as the output video chunks 236 and corresponding transcoded audio chunks 238 become available. The subchunk module 214 publishes the output media stream 239 to the live chunk manager 218.

The live chunk manager 218 is the exit point of the transcoding pipeline. The live chunk manager 218 receives portions of the output media stream 239 as the portions are published by the subchunk module 214. The live chunk manager 218 can distribute the output media stream 239 to one or more user devices 100. The live chunk manager 218 receives requests for a particular media stream 239 and serves the output media stream 239 to the requesting user devices 100 accordingly.

Figures 3, 4, 5:
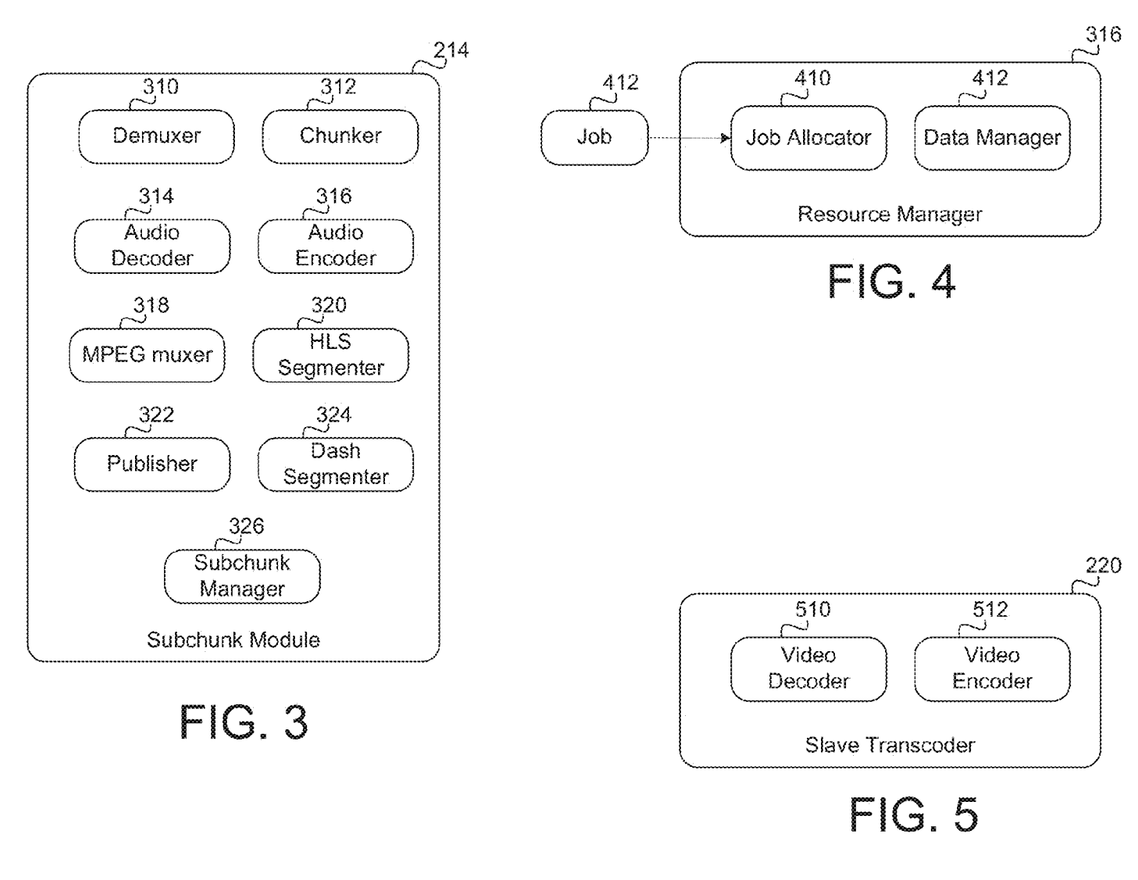
FIG. 3 is a schematic view illustrating example components of a subchunking module.
FIG. 4 is a schematic view illustrating example components of a resource manager.
FIG. 5 is a schematic view illustrating example components of a slave transcoder.

FIG. 3 illustrates an example subchunk module 214. In some implementations, the subchunk module 214 is configured to generate output media streams 232 encoded according to different encoding standards. In the illustrated example, the example subchunk module 214 can generate output media streams 232 encoded according to MPEG Dynamic Adaptive Streaming over HTTP (DASH) or Apple HTTP Live Streaming (HLS). Moreover, in the illustrated example, the subchunk module 214 can include a demuxer 310, a chunker 312, an audio decoder 314, an audio encoder 314, an MPEG muxer 318, an HLS segmenter 320, a publisher 322, a dash segmenter 324, and a subchunk manager 326.

In operation, the demuxer 310 receives the input media stream 232 and demultiplexes the input media stream 232 into the video portion 232' and the audio portion 232". In some implementations, the demuxer 310 calls a preexisting library (e.g., the Ffmpeg third-party library) to demultiplex the input media stream 232 into separate audio portions 232" and video portions 232'. The demuxer 310 outputs the audio portion 232" and video portion 232' as a series of data packets. The demuxer 310 may alternatively be a hardware component that is in communication with the processing device 210.

The chunker 312 receives the audio portion 232" and the video portion 232' of the input media stream 232 and splits the respective portions into audio chunks 237 and video chunks 233. In some implementations, the chunker 312 outputs input video chunks 233 and input audio chunks 237 that are equal in time length (e.g., five seconds). Furthermore, each input video chunk 233 can have a corresponding input audio chunk 237 that starts and ends at the same relative time. For instance, if an input video chunk 233 begins at time stamp 0.15 seconds, then the chunker 312 splits an input audio chunk 237 that also begins at timestamp 0.15 seconds. The chunker 312 can assign each input video chunk 233 a chunk identifier ("chunk ID") that identifies the input video chunk 233 from other input video chunks 233 of the input media stream 232. Similarly, the chunker 312 can assign chunk identifiers to each input audio chunk 237. In some implementations, corresponding audio chunks 237 and video chunks 233 may be assigned the same or corresponding chunk identifiers. Additionally, input video chunks 233 and audio chunks 237 can be tagged by a chunk type (e.g., audio or video).

For each input video chunk 233, the chunker 312 can split the input video chunk 233 into a series of input video subchunks 234. The chunker 312 can assign each input video subchunk 234 a subchunk identifier ("subchunk ID") that identifies the input video subchunk 234 from other input video subchunks 234 of the input video chunk 233. The chunker 312 splits input video subchunks 234 into equal time divisions, such that each input video chunk 233 has the same number of input video subchunks 234 having the same time lengths. In this way, the video portion 232' of the input media stream 232 is organized in a series of video chunks 233 and video subchunks 234. A single video chunk 233 includes an ordered list of video subchunks 234. In some implementations, the subchunks 234 are ordered by their subchunk ID (e.g., a timestamp) and are uniquely identified by the chunk ID. The input video subchunks 234 may each further include an identifier that identifies the input video chunk 233 to which the input video subchunk 234 belongs and the type of the subchunk 234 (e.g., video).

In some implementations, the chunker 312 can split each input audio chunk 237 into a series of input audio subchunks. In these implementations, the chunker 312 can assign each audio subchunk a subchunk ID. The input audio subchunks may each further include an identifier that identifies the input audio chunk 237 to which the input audio subchunk belongs and the type of the subchunk (e.g., audio).

Output video chunks 236, output audio chunks 238, output video subchunks 235, and output audio subchunks may include similar fields as the input counterparts. For example, the output video and audio chunks 236, 238 can indicate a type of the chunk. Similarly, the output video subchunks 235 and output audio chunks can include an identifier that identifies the chunk to which the subchunk belongs.

The chunker 312 may be further configured to analyze the video portion 232' of the input video stream 232 for lost video packets. In these implementations, the chunker 312 can flag an input video chunk 233 as damaged if one or more video packets in the input video chunk 233 are lost or damaged. In operation, the chunker 312 monitors the incoming video portion 232' of the input stream for a discontinuity in the stream. The discontinuity can occur within a single input video chunk 233 or across a boundary of two neighboring input video chunks 233. In either scenario, when an input video chunk contains a discontinuity, the chunker 312 labels the input video chunk 233 locally as damaged by marking a subchunk flag field (e.g., marking the subchunk flag field as "BaD"). In some implementations, the chunker 312 marks all subsequent subchunks 234 in the input video chunk 233 as damaged as well. These subchunks 234 are subsequently written to the resource manager 216, which provides the subchunks 234 to the slave transcoders 220. When a slave transcoder 220 processes an input video subchunk 234 marked as damaged, the slave transcoder 220 continues to read the damaged subchunks 234, until it reaches the last subchunk of the input video chunk 233 marked as such. At this point, the slave transcoder 220 generates a new output video chunk 236 (comprised of flagged output video subchunks 235) using preloaded key/sync frames, marks the output video chunk 236 as such, and writes the flagged output video chunk 236 to the resource manager 216. In some implementations, the flagged output video chunk 236 is comprised of repeated numbers of the same, fixed, and preloaded key/sync frames. The output video chunk 236 may contain a single output video subchunk 235, marked as "BaD".

The audio decoder 314 receives and decodes the input audio chunks 237 of the audio portion 232" of the input media stream 232. In some implementations, the audio decoder 314 decodes audio chunks into pulse-code modulation ("PCM") samples. The audio decoder 314 may be configured to detect lost audio packets in an audio chunk 237. If the audio decoder 314 detects a lost audio packet, the audio decoder 314 inserts a silent audio PCM sample into the PCM samples of the audio chunk 237.

The audio encoder 316 receives the series of PCM samples and encodes the PCM samples into output audio chunks 238. The audio encoder 316 encodes the PCM samples into any suitable format (e.g., AAD). The encoder 316 can assign the chunk ID to the output audio chunk 238, where the chunk ID is the same as or corresponds to the chunk ID of the input audio chunk 237 used to generate the output audio chunk 238.

The subchunk manager 326 is an interface between the subchunk module 214 and the resource manager 216. The subchunk manager 326 receives video chunks 233 and subchunks 234 from the chunker 312 and writes the input video chunks 233 and subchunks 234 to the resource manager 216. In some implementations, the subchunk manager 326 can write input video subchunks 234 to the resource manager 216 while the chunker 312 is receiving subsequent audio and video portions of the respective input chunk 233, 237 from the demuxer 310. In this way, the subchunk manager 326 communicates earlier video subchunks 234 to the resource manager 312 before subsequent video subchunks 234 of the same input video chunk 233 are received by the chunker 312, the demuxer 310, or in some scenarios the streaming agent 212. In these implementations, latency times of the media stream may be reduced as the transcoding of a chunk 233 can commence before the transcoding server 200 receives the entire input video chunk 233. In some implementations, the subchunk manager 326 may be further configured to write the output audio chunks 238 and/or output audio subchunks to the resource manager 216.

The subchunk manager 326 receives output video chunks 236 from the resource manager 216. The resource manager 216 can write an output video chunk 236 to subchunk manager 326 as the output video chunk 236 is written to the resource manager 216. The subchunk manager 326 can provide the received output video chunks 236 to the MPEG muxer 318 and/or the dash segmenter 324, depending on the format for transmission of the output media stream 239. For instance, if the output media stream 239 is to be transmitted as an HLS stream, then the subchunk manager 326 provides the received output video chunks 236 and corresponding output audio chunks 238 to the MPEG muxer 318. If the output media stream 239 is to be transmitted as a DASH stream, then the subchunk manager 326 provides the received output video chunks 236 and corresponding output audio chunk 238 or audio subchunks to the DASH segmenter 324. The subchunk manager 326 can identify corresponding output audio chunks 238 and output video chunks 236 based on their respective chunk identifiers or their respective timestamps. In some implementations, one or more of the chunker 312 and the resource manager 216 can perform some or all of the functions of the subchunk manager 326.

When the output media stream 239 is an HLS stream, the MPEG muxer 318 multiplexes the output audio chunks 238 and corresponding output video chunks 236 to a suitable MPEG format (e.g., MPEG-2 TS) to obtain the output media stream 239. The HLS segmenter 320 receives the output media stream 239 as a MPEG-2 transport stream and outputs the output media stream 239 as a series of equal-length files. The HLS segmenter 320 outputs the segmented output media stream 239 to the publisher 322. The publisher 322 publishes the segmented output media stream 239 to the live chunk manager 218. The publisher 322 publishes the segments of the output media stream 239 as they are received. In this way, the live chunk manager 218 can distribute the output media stream 239 in real time or close to real time.

When the output media stream 239 is a DASH stream, the output audio chunks 238 and corresponding output video chunks 236 do not need to be multiplexed. Thus, the output audio chunks 238 and corresponding output video chunks 236 are communicated to the DASH segmenter 324. The DASH segmenter 324 receives the output audio chunks 238 and corresponding output video chunks 236 and generates the output media stream 239 as a series of small HTTP file segments. The DASH segmenter 324 writes the output media stream 239 to the publisher 322. The publisher 322 publishes the segments of the output media stream 239 as they are received.

The example subchunk module 214 of FIG. 3 is configured to provide DASH media streams and HLS media streams. The subchunk module 214 can be adapted, however, to output other suitable types of media streams, now known or later developed. The subchunk module 214 is provided for example and variations of the subchunk module 214 are within the scope of the disclosure. The subchunk module 214 may include other components not shown in FIG. 3. For example, the subchunk module 214 can include one or more encryption modules that encrypt the output media streams 239.

FIG. 4 illustrates an exemplary resource manager 216 that includes a job allocator 410 and a data manager 412. The job allocator 410 receives a transcoding job 412. The transcoding job 412 includes an identifier of the input media stream 232 (e.g., a channel identifier or content file identifier) and a set of encoding parameters for the output media stream 239. The job allocator 410 configures the slave transcoders 220 to transcode the input subchunks 233 into the output video subchunks 235 and chunks 236 according to the encoding parameters for the output media stream 239. The encoding parameters can include a video resolution, a target bit rate, a video codec type, a target GOP size, or any other suitable parameter.

The job allocator 410 assigns received input video chunks 233 of the input media stream 232 to m slave transcoders 220, where m is an integer greater than or equal to one. The job allocator 410 assigns the m slave transcoders 220 from a plurality of slave transcoders 220. The plurality of slave transcoders 220 can be arranged in an array or queue 220' or some similar structure. In some implementations, the queue is a FIFO queue that maintains slave transcoders 220 in an available state. When the job allocator 410 receives an input video subchunk 234 of a new input video chunk 233, the job allocator 410 dequeues m slave transcoders 220 from the queue and assigns the new input video chunk 233 to the dequeued slave transcoders 220. Once the job allocator 410 assigns the new input video chunk 233 to the m slave transcoders 220, the job allocator 410 begins feeding the input video subchunks 234 to the assigned slave transcoders 220. As each of the m slave transcoders 220 transcodes the input video subchunks 234, the slave transcoders 220 return the output video chunks 236 comprised of output video subchunks 235 to the job allocator 410. The job allocator 410 can return the output video chunks 236 to the subchunk module 214.

The job allocator 410 feeds each input video subchunk 234 to each of the m slave transcoders 220 until one of the m slave transcoders 220 completes transcoding the entire input video chunk 233. Upon determining that one of the m slave transcoders 220 has completed transcoding all of the video subchunks 234 of the assigned input video chunk 233, the job allocator 410 can stop the other m−1 slave transcoders 220, update the state of all of the m slave transcoders 220 to available, and return the m slave transcoders 220 to the queue 220'.

The job allocator 410 can continue to operate in the foregoing manner for the duration of the input media stream 232. The job allocator 410 can cycle through the slave transcoders 220 and can have multiple sets of m slave transcoders 220 transcoding different input video chunks 233 concurrently. For example, the job allocator 410 can begin the transcoding of a subsequent input video chunk 233 by a set of m slave transcoders 220 while a previous input video chunk 2333 is still being transcoded by a different set of m slave transcoders 220. In this way, the latency times for transcoding the input media stream 232 can be reduced.

The data manager 412 stores input video chunks 233 and output video chunks 236 in the memory device 230 and the storage device 240. The job allocator 410 may provide received video chunks 233 and returned output video chunks 236 to the data manager 412.

The data manager 412 can write one or more copies of each input video chunk 233 to the memory device 230. In some implementation, an input video chunk 233 is stored as the series of input video chunks 233. When storing the input video chunk 233, the data manager 412 can index each of the input video chunks 233 in the memory device 230 using the chunk ID of the video chunk 233. Similarly, the data manager 412 can index each of the input video subchunks 234 memory device 230 using the subchunk ID of the video subchunk 234. In some implementations, the data manager 412 uses public data structures to allow the subchunk module 214 to write data to memory device 230 and to allow a slave transcoder 220 to read data from the memory device 230.

The data manager 412 also writes one or more copies of each output video chunk 236 memory device 230. In some implementations, the data manager 412 stores the transcoded frames and/or the subchunks 234 of each output video chunk 236. The data manager 412 can index each of the output video chunks 236 in the memory device 230 using the chunk ID of the chunk 236. Additionally, the data manager 412 can index each output video subchunk 235 in the memory device 230 using the subchunk ID of the subchunk 235. In some implementations, the data manager 412 uses public data structures to allow the subchunk module 214 to read data from the memory device 230 and to allow the slave transcoder 220 to write data to the memory device 230.

In some implementations, the data manager 412 also stores one or more copies of each input audio chunk 237 and output audio chunk 238 in the memory device 230. The input audio chunk 237 and output audio chunks 238 can be referenced by their respective chunk ID. Further, the data manager 412 can use public data structures that allow the subchunk module 214 to read and write audio data from the storage device 240.

For purposes of debugging, the data manager 412 can replicate the data stored in the memory device 230 in the storage device 240. For example, the input and output video chunks 233, 236 and input and output audio chunks 237, 238 can be stored in the storage device 240 in a .cns files. Furthermore, metadata corresponding to the input and output video chunks 233, 236 and input and output audio chunks 237, 238 can be stored in the storage device 240.

FIG. 5 illustrates an example slave transcoder 220. A slave transcoder 220 is responsible for transcoding input video chunks 233. The slave transcoders 220 read input video chunks 233 from the resource manager 216 and write output video subchunks 235 of an output video chunk 236 to the resource manager 216.

Each slave transcoder 220 can reside one of three different states: "uninitialized", "available", and "busy". Before a slave transcoder 220 has been configured to encode input video chunks 233 according to a set of encoding parameters, the state of the slave transcoder 220 is uninitialized. Once the slave transcoder 220 is initialized/configured and has been entered into the queue 220', the resource manager 216 changes the state of the slave transcoder 220 to available. When a slave transcoder 220 is in the "available" state, the slave transcoder 220 is ready to perform transcoding. In some implementations, a slave transcoder 220 periodically reports its state as available. A slave transcoder 220 must be in the available state to receive a transcoding job. When the resource manager 216 assigns an input video chunk 233 to the slave transcoder 220, the resource manager 216 changes the status of the slave transcoder 220 to busy. When a slave transcoder 220 is in the busy state it is transcoding an input video chunk 233 and cannot be assigned another transcoding job. When the slave transcoder 220 finishes transcoding an input video chunk 233, the slave transcoder 220 returns the output video chunk 236 to the resource manager and the resource manager 216 updates the state of the slave transcoder to available.

The slave transcoders 220 each include a video decoder 510 and a video encoder 512. In some implementations, the video decoder 510 decodes the input video subchunks 234 into raw YUV frames. The video encoder 512 encodes the raw YUV frames into the output video subchunks 235. The video encoder 512 encodes the output video subchunks 235 according to the encoding parameters. These two concatenating stages (decoding followed by encoding) are implemented in order to parallelize decoding and encoding so that the raw YUV frames coming out of the decoding stage can be immediately pushed to the subsequent encoding stage for encoding.

In operation, the resource manager 216 assigns a transcoding job (i.e., a input video chunk 233 to be transcoded) to a slave transcoder 220. The resource manager 216 216 provides a chunk ID of the input video chunk 233 that is to be transcoded, an chunk ID to provide to the output video chunk 234, and the encoding parameters of the output video chunk 234. At the onslaught of the transcoding, the resource manager 216 can initialize all of the slave transcoders 220 to encode the output video chunks 236 according to the encoding parameters. Furthermore, the slave transcoders 220 can load predefined sync/key frames (IDR in H264/AVC) for error handling purpose upon being initialized.

The slave transcoder 220 begins reading input video subchunks 234 of the input video chunk 233 from the resource manager 216. The slave transcoders 220 feed the video subchunks 234 to the video decoder 510 and feed the YUV frames to the encoder 512. The slave transcoders 220 continue to read input video subchunks 234 from the resource manager 216 until it reaches the last subchunk 234 of the input video chunk 233. Once the slave transcoder 220 has transcoded all of the subchunks 234 of an input video chunk 233, the slave transcoders 220 can assemble the output video subchunks 235 into an output video chunk 236 and can write the output video chunk 236 to the resource manager 216. Additionally or alternatively, the slave transcoder 220 returns transcoded output video subchunks 235 to the resource manager 216. In some implementations, the slave transcoder 220 waits until it has transcoded all of the video subchunks 233 prior to returning the output video subchunks 235. In other implementations, the slave transcoder 220 returns output video subchunks 235 to the resource manager 216 as they become available.

In some implementations the slave transcoders 220 are configured to handle damaged input video chunks 233. When a slave transcoder 220 receives a damaged an input video subchunk 234 (e.g., an input video chunk 234 marked as "BaD"), the slave transcoder 220 stops transcoding the input video subchunk 234 and discards the input video chunk 233 and any output video subchunks 235 that the slave transcoder 220 had already transcoded. The slave transcoder 220 then creates a replacement output video chunk 236 using the predefined sync/key frames and writes the replacement video chunk 236 to the resource manager 216. The slave transcoder 220 can flag the replacement output video chunk as such. The resource manager 216 then updates the state of the slave transcoder 220 to available.

In some implementations, a slave transcoder 220 transcodes an input video chunk 233 that is to be transcoded by transcoding at least a portion of the input video chunk 233 immediately preceding the input video chunk 233 to be transcoded and then transcoding the input video chunk 233 to be transcoded. In these implementations, the slave transcoder 220 outputs a single output video chunk 236 that corresponds to the input video chunk 233 to be transcoded. In operation, the resource manager 216 feeds at least a portion of the input video chunk 233 preceding the input video chunk 233 to be transcoded to the decoder 512 followed by the input video chunk 233 that is to be transcoded. Thus, each slave transcoder 220 transcodes input video subchunks 234 from two consecutive input video chunks 233. In some of these implementations, the slave transcoder 220 transcodes the entire input video chunk 233 preceding the input video chunk 233 to be transcoded prior to transcoding the input video chunk 233 to be transcoded. In other implementations, a slave transcoder 220 transcodes later input video subchunks 234 of the input video chunk 233 preceding the input video chunk 233 to be transcoded (e.g., the final three subchunks 234) prior to transcoding the input video chunk 233 to be transcoded. In either case, when the slave transcoder 220 finishes transcoding the input video subchunks 234 of both input video chunks 233, the slave transcoders 220 discards the output video subchunks 235 corresponding to the preceding input video chunk 233 and returns the output video subchunks 235 corresponding to the input video chunk 233 to be transcoded. The slave transcoders 220 can implement the foregoing techniques to avoid sudden discontinuity in quality for the initial key or sync frame in the output video chunk 236 for single pass transcoding. The resource manager 216 may feed the first input video chunk 233 of the input media stream 233 to the m slave transcoders twice. Thereafter, the resource manager 216 feeds consecutive input video chunks 233 to the set of m slave transcoders 220 assigned to transcode the second of the consecutive input video chunks 233.

Referring back to FIG. 2A, in some implementations the transcoding server 200 is designed to recover from fatal errors in one or more of the components thereof. Fatal errors can occur in the slave transcoders 220, the resource manager 216, the subchunk module 214, the streaming agent 212, and/or the live chunk manager 218.

One type of error is the failure of a slave transcoder 220. For example, the resource manager 216 may assign a transcoding job to an already failed slave transcoder 220. In implementations where the resource manager 216 assigns transcoding jobs to multiple transcoders 220, the redundant assignments alleviate any concerns of a non-functioning slave transcoder 220. Once a failed transcoder 220 is discovered, the failed transcoder 220 can be restarted.

An issue may arise where the resource manager 216 fails. For example, a slave transcoder 220 may be unable to read input video subchunks 234 from the resource manager 216. In such a scenario, the slave transcoder 220 terminates the current transcoding job and changes its state to "available" and reports its current state. In another scenario, the slave transcoder 220 may be unable to write output video subchunks 235 to the resource manager 216. In such a scenario, the slave transcoder 220 ignores the failure, completes the transcoding job, and updates its state to available. In another example, the subchunk module 214 may be unable to write input audio chunks 237 and/or input video chunks 233 to the resource manager 216. In this scenario, the subchunk module 214 can ignore the failure and can continue to attempt to write the input chunks 233, 237 to the resource manager 216 as if the failure never occurred. If, however, the subchunk module 214 is unable to read output video chunks 236 over a given timeout period, the subchunk module 214 can generate a "BaD" output video chunk 236 to replace the missing output video chunks 236. Eventually, a failed resource manager 216 can be restarted. After the restart, the resource manager 216 can discard any input video subchunks 234 received as parts of input video chunks 233 that are already being processed. The resource manager 216 can begin processing the input video subchunks 234 once it begins receiving a new input video chunk 233.

Another type of error is the failure of the subchunk module 214. When the subchunk module 214 fails, any slave transcoders 220 performing transcoding jobs can terminate the current transcoding job and update their respective states to available and the resource manager 216 can stop assigning transcoding jobs to slave transcoders 220. In this scenario, the live chunk manager 218 stops receiving the output media stream 239 and the streaming agent 212 stops delivering the input media stream 232. When the subchunk module 214 fails, the subchunk module 214 is eventually restarted and the operation of the other components can resume operation.

An issue may arise where the stream agent 212 fails. In this scenario, the other components can continue operation and attempt to transcode input media streams 232. Because, however, the stream agent 212 is in a failed state, the subchunk module 214 does not receive the input media stream 232. The remaining components are unaffected. Once the stream agent 212 restarts, the subchunk module 214 can begin receiving input media streams 232 and transcoding can commence.

Another type of error is the failure of the live chunk manager 218. When the live chunk manager 218 fails the rest of the components can continue to transcode input media streams 232 to output media streams 234. In this scenario, the subchunk module 214 can attempt to write portions of the output media streams 239 to the live chunk manager 218. When the subchunk module 214 cannot write to the live chunk manager 218, the subchunk module 214 can discard the available portions of the output media stream 239. Once the live chunk manager 218 restarts, the subchunk module 214 can commence delivery of the output media stream 239.

The foregoing types of errors are provided for example. The transcoding server 200 can encounter other types of errors as well. The techniques by which the transcoding server 200 handles errors can vary as well.

Figure 6:
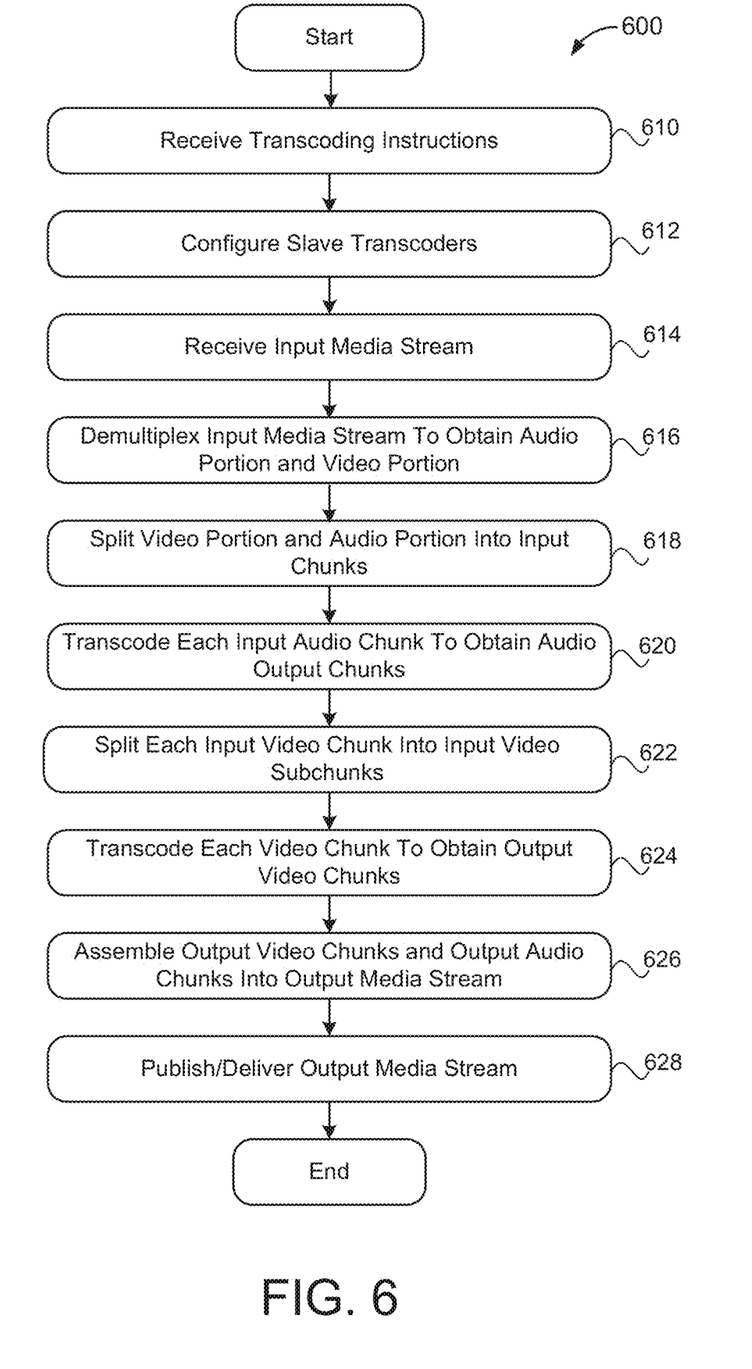
FIG. 6 is a schematic view of an example set of operations of a method for delivering a media stream to a user device.

FIG. 6 illustrates an exemplary set of operations for a method 600 for delivering an output media stream 239 to a user device 100. The method 600 is explained with respect to the components of the transcoding server 200 discussed above. The method 600, however, may be executed by any suitable device.

At operation 610, the transcoding server 200 receives transcoding instructions. The transcoding instructions can include a stream identifier of an input media stream 232 to encode and the encoding parameters for encoding the input media stream 232. The transcoding instructions can be received from a user device 100, from another device, or internally. For example, a user device 100 can request a live stream of a channel. In another example, the transcoding server 200 may be set up to make any number of channels and video-on-demand contents available at different encoding parameters. The stream identifier can identify a channel feed or media content to transcode. The encoding parameters indicate the target encoding for the output media stream 239.

At operation 612, the resource manager 216 configures the slave transcoders 220. For example, the resource manager 216 can set the output bit rate of the slave transcoders 220. The resource manager 216 may also establish the queue 220' of slave transcoders 220 as well.

At operation 614, the subchunk module 214 receives the input media stream 232 by way of the streaming agent 212.

The streaming agent 212 can receive the input media stream 232 from any suitable content source 120. For example, the streaming agent 212 may receive the content from a cable provider, a network, individuals, a movie studio, or any other suitable source.

At operation 616, the subchunk module 214 demultiplexes the input media stream 232 into an audio portion 232" and a video portion 232'. At operation 618, the subchunk module splits the audio portion 232" into input audio chunks 237 and the video portion 232' into input video chunks 233. The input video chunks 233 and the input audio chunks 237 are split into equal size chunks (e.g., 5 millisecond seconds). Each input chunk 233, 237 may be assigned a chunk ID and flagged with its chunk type.

At operation 620, the subchunk module 214 transcodes the input audio chunks 237. The subchunk module 214 can transcode the input audio chunks 237 according to the desired encoding parameters for the audio portion of the output media stream 239. The subchunk module 214 transcodes the input audio chunks 237 into output audio chunks 238.

At operation 622, the subchunk module 214 splits the input video chunks 233 into input video subchunks 234. The input video subchunks 234 are of equal length (e.g., 0.05 millisecond segments). The subchunk module 214 can assign a subchunk ID to each input video subchunk 234. The subchunk module 214 can write the input video subchunks to the resource manager 216. At operation 624, the resource manager 216 and the slave transcoders 220 transcode the input video chunks 233.

Figure 7:
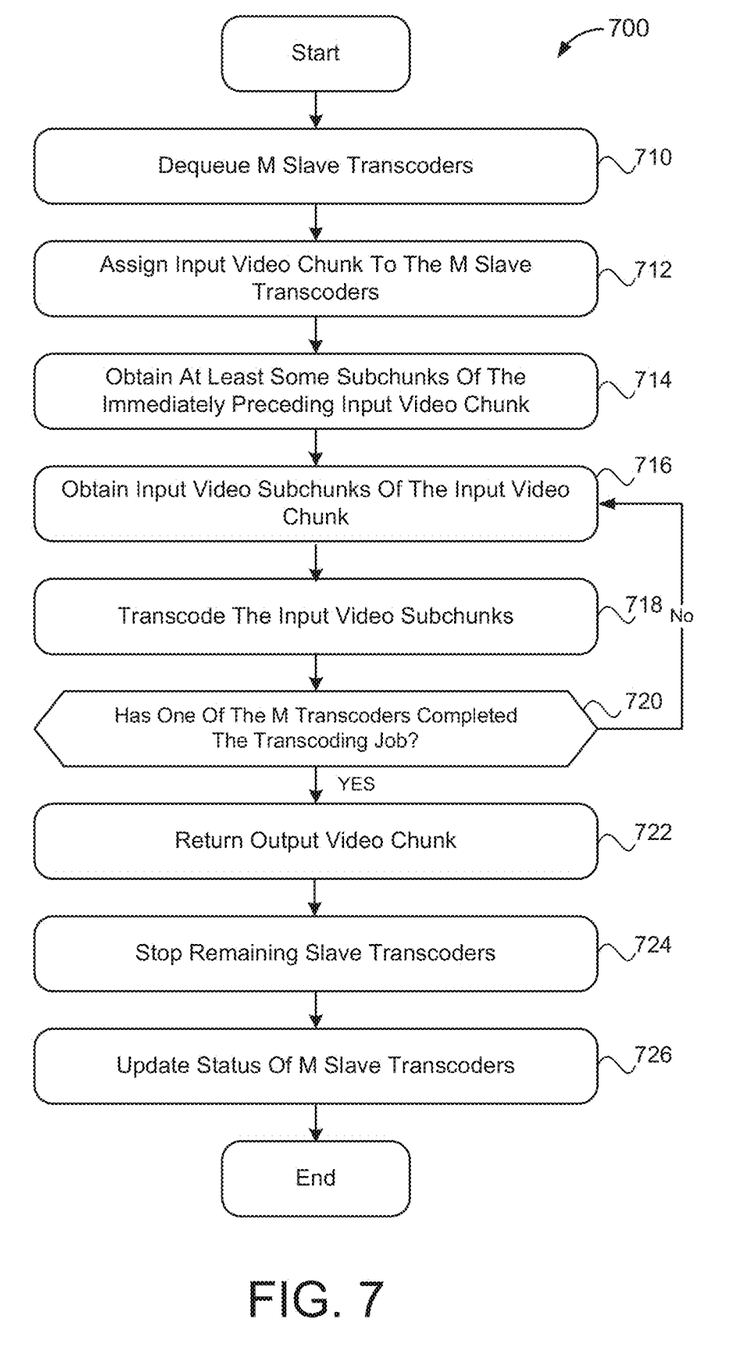
FIG. 7 is a schematic view of an example set of operations of a method for transcoding an input video chunk.

FIG. 7 illustrates a set of operations for a method for transcoding an input video chunk 233. At operation 710, the resource manager 216 dequeues m slave transcoders 220 from the queue 220', where m is an integer greater than or equal to one. At operation 712, the resource manager 216 assigns the input video chunk 233 to the m slave transcoders 220. The resource manager 216 can update the status of the each of the m slave transcoders to busy.

In some implementations, the m slave transcoders 220 obtain at least some subchunks 234 of the input video chunk 233 immediately preceding the input video chunk 233 to be transcoded, as shown at operation 714. The m slave transcoders 220 can read all of the subchunks 234 of the preceding input video chunk 233 or the last one or more subchunks 234 of the preceding input video chunk 233 from the resource manager 216.

At operation 716, the m slave transcoders 220 obtains the input video subchunks 234 of the input video chunk 233 to be transcoded. The input video subchunks 234 can be read from the resource manager 216 sequentially, such that the slave transcoders 220 read earlier input video subchunks 234 prior to subsequent input video subchunks 234. In some implementations, the m slave transcoders 220 read earlier input video subchunks 234 while later input video subchunks 234 are being received by the subchunk module 214.

At operation 718, the m slave transcoders 220 transcode the input video subchunks 234. In some implementations, each of the m slave transcoders 220 decodes an input video subchunk 234 into YUV frames and then encodes the YUV frames into output video subchunk 235. The m slave transcoders 220 can work independently and at their own respective speeds. As a slave transcoder 220 finishes decoding an input video subchunk 234, it can obtain the next input video subchunk 234 and begin decoding the next input video subchunk 234. Similarly, as a slave transcoder 220 encodes an output video subchunk 235, the slave transcoder 220 can begin decoding the next available YUV frames as soon as the slave transcoder 220 finishes decoding the YUV frames. As previously indicated, in some implementations, the m slave transcoders 220 begin transcoding input video subchunks 234 of a preceding input video chunk 233 before transcoding the input video subchunks 234 of the input video chunk 233 to be transcoded. When transcoding the input video subchunks 234 of the preceding input video chunk 233, the slave transcoders 220 can discard the output video subchunks 235 corresponding thereto.

At operation 720, the resource manager 216 determines whether one of the m slave transcoders 220 has finished the transcoding job (i.e., transcoding the input video subchunk 233). If not, the m slave transcoders 220 continue transcoding the input video subchunks.

When one of the slave transcoders 220 has completed transcoding the entire input video chunk 233, the slave transcoder 220 returns an output video chunk 236, as shown at operation 722. Once a slave transcoder 220 has completed transcoding all of the input video subchunks 234 of an input video chunk 233, the slave transcoder 220 assembles an output video chunk 236 from the output video subchunks 235. The slave transcoder 220 returns the output video chunk 236 to the resource manager 216. In some implementations, the slave transcoders 220 can return output video subchunks 235 to the resource manager 216 and the resource manager 216 assembles the output video subchunks 235 into output video chunks 236.

At operation 724, the resource manager 216 stops the remaining m−1 slave transcoders 220 and discards the output video subchunks 235 transcoded by the m−1 slave transcoders 220. The resource manager 216 can return the output video chunk 236 to the subchunk module 214. At operation 726, the resource manager 216 updates the status of the m slave transcoders 220 to "available". The resource manager 216 can enqueue the m slave transcoders 220 onto the queue 220'.

Referring back to FIG. 6, the resource manager 216 and the slave transcoders 220 continuously transcode the input video chunks 233 as they are received and chunked by the subchunk module 214. It is noted that the subchunk module 214 can transcode audio chunks 237 while the resource manager 216 and the slave transcoders 220 transcode the input video chunks 233.

At operation 626, the subchunk module 214 assembles the output video chunks 236 and the output audio chunks 238 into the output media stream 239. As previously discussed, the subchunk module 214 can generate output media streams 239 according to one or more protocols (e.g., HLS and/or DASH). At operation 628, the subchunk module 214 publishes the output media stream 239 to the live chunk manager 218. The live chunk manager 218 can transmit the output media stream 239 to one or more downstream user devices 100.

The order of the operations performed in the FIGS. 6 and 7 is not essential. Many of the operations occur concurrently for different portions of an input media stream 232. For instance, transcoding audio and video chunks can be performed simultaneously and there may be instances where multiple video chunks 233 are being transcoded at the same time by different slave transcoders 220. Many of the operations described above can be performed in parallel and/or serially. For instance, a slave transcoder 220 can receive video subchunks 234 while transcoding other input video subchunks 234. Similarly, audio chunks 238 can be transcoded at the same time is video chunks 233. Furthermore, the methods 600 and 700 may include alternate or additional operations.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
 receiving an input media stream encoded according to a first set of encoding parameters;
 splitting a video portion of a received portion of the input media stream into input video chunks while receiving a remaining portion of the input media stream;
 for each input video chunk of the video portion of the input media stream:
  assigning the input video chunk to one or more slave transcoders;
  splitting the input video chunk into input video subchunks;
  separately feeding each input video subchunk to each of the one or more slave transcoders that transcode data from the first set of encoding parameters to a second set of encoding parameters;
  transcoding each input video subchunk into a corresponding output video subchunk;
  assembling the output video subchunks into an output video chunk corresponding to the input video chunk; and
 assembling the output video chunks into an output media stream.

2. The method of claim 1, further comprising:
 splitting a received portion of the input video chunk into input video subchunks while still receiving a remaining portion of the input video chunk; and
 feeding at least one input video subchunk to the one or more slave transcoders while still receiving the remaining portion of the input video chunk.

3. The method of claim 1, wherein each slave transcoder includes a slave decoder and a slave encoder, the slave encoder encoding a first input video subchunk while the slave decoder decodes a second input video subchunk.

4. The method of claim 1, further comprising assembling the output video chunks into the output media stream while splitting any remaining portion of the video portion of the input media stream into input video chunks.

5. The method of claim 4, further comprising:
 assigning the input video chunk to a plurality of slave transcoders; and
 when one of the plurality of slave transcoders completes transcoding the input video chunk, commanding the other slave transcoders of the plurality of transcoders to stop transcoding the input video subchunks of the input video chunk.

6. The method of claim 5, further comprising, after commanding the other slave transcoders of the plurality of transcoders to stop transcoding, identifying all of the slave transcoders as being available to receive another input video chunk.

7. The method of claim 1, further comprising:
 demultiplexing the input media stream into the video portion and an audio portion of the input media stream; and
 splitting the audio portion of the input media stream into input audio chunks, each input audio chunk respectively corresponding to one of the input video chunks of the video portion.

8. The method of claim 7, wherein each corresponding pair of input audio chunk and input video chunk begins at a same time within the input media stream and has a same time length.

9. The method of claim 8, further comprising:
 for each input audio chunk:
  decoding the input audio chunk into audio samples;
  when a lost audio packet within the input audio chunk is detected, inserting a silent audio sample into the audio samples at a location corresponding to the lost audio packet; and
  encoding the audio samples into an output audio chunk.

10. The method of claim 9, wherein assembling the output video chunks into the output video stream comprises aligning each output audio chunk with a corresponding output video chunk.

11. The method of claim 1, further comprising:
 retrieving the one or more slave transcoders from a queue of available transcoders; and
 when the one or more slave transcoders complete transcoding an assigned input video chunk, releasing the one or more transcoders back into the queue of transcoders.

12. The method of claim 1, further comprising:
 for each input video chunk:

obtaining at least one preceding input video subchunk of a preceding input video chunk that immediately precedes the input video chunk; and feeding the at least one preceding input video subchunk to the one or more slave transcoders before feeding the input video subchunks of the input video chunk.

13. The method of claim 1, further comprising publishing the output media stream.

14. The method of claim 1, further comprising transmitting the output media stream to a user device.

15. A transcoding server comprising:

a non-transitory computer readable medium storing computer readable instructions;

a plurality of slave transcoders that transcode data from a first set of encoding parameters to a second set of encoding parameters; and a processing device in communication with the computer readable medium and executing the computer readable instructions, the computer readable instructions causing the processing device to:

receive an input media stream encoded according to the first set of encoding parameters;

split a video portion of a received portion the input media stream into input video chunks while receiving a remaining portion of the input media stream;

for each input video chunk of the video portion of the input media stream:

assign the input video chunk to one or more slave transcoders;

split the input video chunk into input video subchunks;

separately feed each input video subchunk to each of the one or more slave transcoders that transcode the input video subchunk into an output video subchunk, wherein when one of the one or more slave transcoders transcodes all of the input video subchunks of the input video chunk to output video subchunks, the slave transcoder assembles the output video subchunks into an output video chunk; and receive the output video chunk corresponding to the input video chunk from the one slave transcoder; and assemble the output video chunks into an output media stream.

16. The server of claim 15, wherein the processing device:
splits a received portion of the input video chunk into input video subchunks while still receiving a remaining portion of the input video chunk; and feeds at least one input video subchunk to the one or more slave transcoders while still receiving the remaining portion of the input video chunk.

17. The server of claim 15, wherein each slave transcoder includes a slave decoder and a slave encoder, the slave encoder encoding a first input video subchunk while the slave decoder decodes a second input video subchunk.

18. The server of claim 15, wherein the processing device assembles the output video chunks into the output media stream while splitting any remaining portion of the video portion of the input media stream into input video chunks.

19. The server of claim 18, wherein the processing device:
assigns the input video chunk to a plurality of slave transcoders; and when one of the plurality of slave transcoders completes transcoding the input video chunk, commands the other slave transcoders of the plurality of transcoders to stop transcoding the input video subchunks of the input video chunk.

20. The server of claim 19, wherein after commanding the other slave transcoders of the plurality of transcoders to stop transcoding, the processing device identifies all of the slave transcoders as being available to receive another input video chunk.

21. The server of claim 15, wherein the processing device:
demultiplexes the input media stream into the video portion and an audio portion of the input media stream; and splits the audio portion of the input media stream into input audio chunks, each input audio chunk respectively corresponding to one of the input video chunks of the video portion.

22. The server of claim 21, wherein each corresponding pair of input audio chunk and input video chunk begins at a same time within the input media stream and has a same time length.

23. The server of claim 22, wherein, for each input audio chunk, the processing device:
decodes the input audio chunk into audio samples;

when a lost audio packet within the input audio chunk is detected, inserts a silent audio sample into the audio samples at a location corresponding to the lost audio packet; and encodes the audio samples into an output audio chunk.

24. The server of claim 23, wherein the processing device assembles the output video chunks into the output video stream includes aligning each output audio chunk with a corresponding output video chunk.

25. The server of claim 15, wherein the processing device:
retrieves the one or more slave transcoders from a queue of available transcoders; and when the one or more slave transcoders complete transcoding an assigned input video chunk, releases the one or more transcoders back into the queue of transcoders.

26. The server of claim 15, wherein, for each input video chunk, the processing device:
obtains at least one preceding input video subchunk of a preceding input video chunk that immediately precedes the input video chunk; and feeds the at least one preceding input video subchunk to the one or more transcoders before feeding the input video subchunks of the input video chunk.

27. The server of claim 15, wherein the processing device publishes the output media stream.

28. The server of claim 15, wherein the processing device transmits the output media stream to a user device.

29. The server of claim 15, wherein the processing device executes the slave transcoders.

30. The server of claim 15, wherein the slave transcoders execute on one or more other processing devices in communication with the processing device.

31. A transcoding server comprising:

a non-transitory computer readable medium storing computer readable instructions;

a plurality of slave transcoders that transcode data from a first set of encoding parameters to a second set of encoding parameters; and a processing device in communication with the computer readable medium and executing the computer readable instructions, the computer readable instructions causing the processing device to:

receive an input media stream encoded according to the first set of encoding parameters;

split a video portion of a received portion the input media stream into input video chunks while receiving a remaining portion of the input media stream;
for each input video chunk of the video portion of the input media stream:
  assign the input video chunk to one or more slave transcoders;
  split the input video chunk into input video subchunks;
  separately feed each input video subchunk to each of the one or more slave transcoders;
  separately receive output video subchunks from the one or more slave transcoders, each output video subchunk respectively corresponding to one of the input video subchunks; and
  assemble the output video subchunks into an output video chunk corresponding to the input video chunk; and
assemble the output video chunks into an output media stream.

* * * * *